(12) United States Patent
Suzuki et al.

(10) Patent No.: US 7,549,673 B2
(45) Date of Patent: Jun. 23, 2009

(54) AIR BAG APPARATUS

(75) Inventors: Hidenobu Suzuki, Fujinomiya (JP); Takashi Tokita, Fuji (JP); Mikio Ochiai, Fuji (JP)

(73) Assignee: Nihon Plast Co., Ltd. (JP)

( * ) Notice: Subject to any disclaimer, the term of this patent is extended or adjusted under 35 U.S.C. 154(b) by 322 days.

(21) Appl. No.: 10/991,787

(22) Filed: Nov. 18, 2004

(65) Prior Publication Data

US 2005/0104350 A1 May 19, 2005

(30) Foreign Application Priority Data

Nov. 18, 2003 (JP) .............................. 2003-387760

(51) Int. Cl.
*B60R 21/20* (2006.01)
*B60R 21/26* (2006.01)

(52) U.S. Cl. ....................... 280/732; 736/741

(58) Field of Classification Search ................. 280/732, 280/736, 741, 742, 743.1
See application file for complete search history.

(56) References Cited

U.S. PATENT DOCUMENTS

| 3,773,352 | A | * | 11/1973 | Radke | 280/731 |
| 4,136,894 | A | * | 1/1979 | Ono et al. | 280/729 |
| 4,810,005 | A | * | 3/1989 | Fohl | 280/732 |
| 5,058,921 | A | * | 10/1991 | Cuevas | 280/741 |
| 5,074,583 | A | * | 12/1991 | Fujita et al. | 280/730.1 |
| 5,261,693 | A | * | 11/1993 | Krickl et al. | 280/732 |
| 5,310,214 | A | * | 5/1994 | Cuevas | 280/729 |
| 5,400,487 | A | * | 3/1995 | Gioutsos et al. | 280/735 |
| 5,427,406 | A | * | 6/1995 | Zushi et al. | 280/728.2 |
| 5,658,010 | A | * | 8/1997 | Steffens et al. | 280/731 |
| 5,820,161 | A | * | 10/1998 | Svensson | 280/737 |
| 6,142,519 | A | * | 11/2000 | Smith | 280/741 |
| 6,213,496 | B1 | * | 4/2001 | Minami et al. | 280/729 |
| 6,217,066 | B1 | * | 4/2001 | Coleman et al. | 280/737 |
| 6,669,226 | B2 | * | 12/2003 | Fowler et al. | 280/728.2 |
| 6,955,240 | B2 | * | 10/2005 | Ahn et al. | 280/736 |
| 7,090,243 | B2 | * | 8/2006 | Igawa | 280/728.2 |
| 2006/0066087 | A1 | * | 3/2006 | Katsuda et al. | 280/741 |
| 2006/0091661 | A1 | * | 5/2006 | Takimoto | 280/742 |

FOREIGN PATENT DOCUMENTS

| GB | 2218698 A | * | 11/1989 |
| JP | 02-310142 | | 12/1990 |
| JP | 04-92738 | | 3/1992 |
| JP | 05278549 A | * | 10/1993 |
| JP | 2002-187512 | | 7/2002 |

* cited by examiner

*Primary Examiner*—Ruth Ilan
(74) *Attorney, Agent, or Firm*—Kilpatrick Stockton LLP

(57) ABSTRACT

An air bag apparatus for a vehicle is provided with an air bag configured to inflate and deploy with inflow of a gas; a first inflator configured to supply the gas to the air bag having a first pressure-time property; and a second inflator configured to supply the gas to the air bag having a second pressure-time property, the second pressure-time property differing from the first pressure-time property.

6 Claims, 4 Drawing Sheets

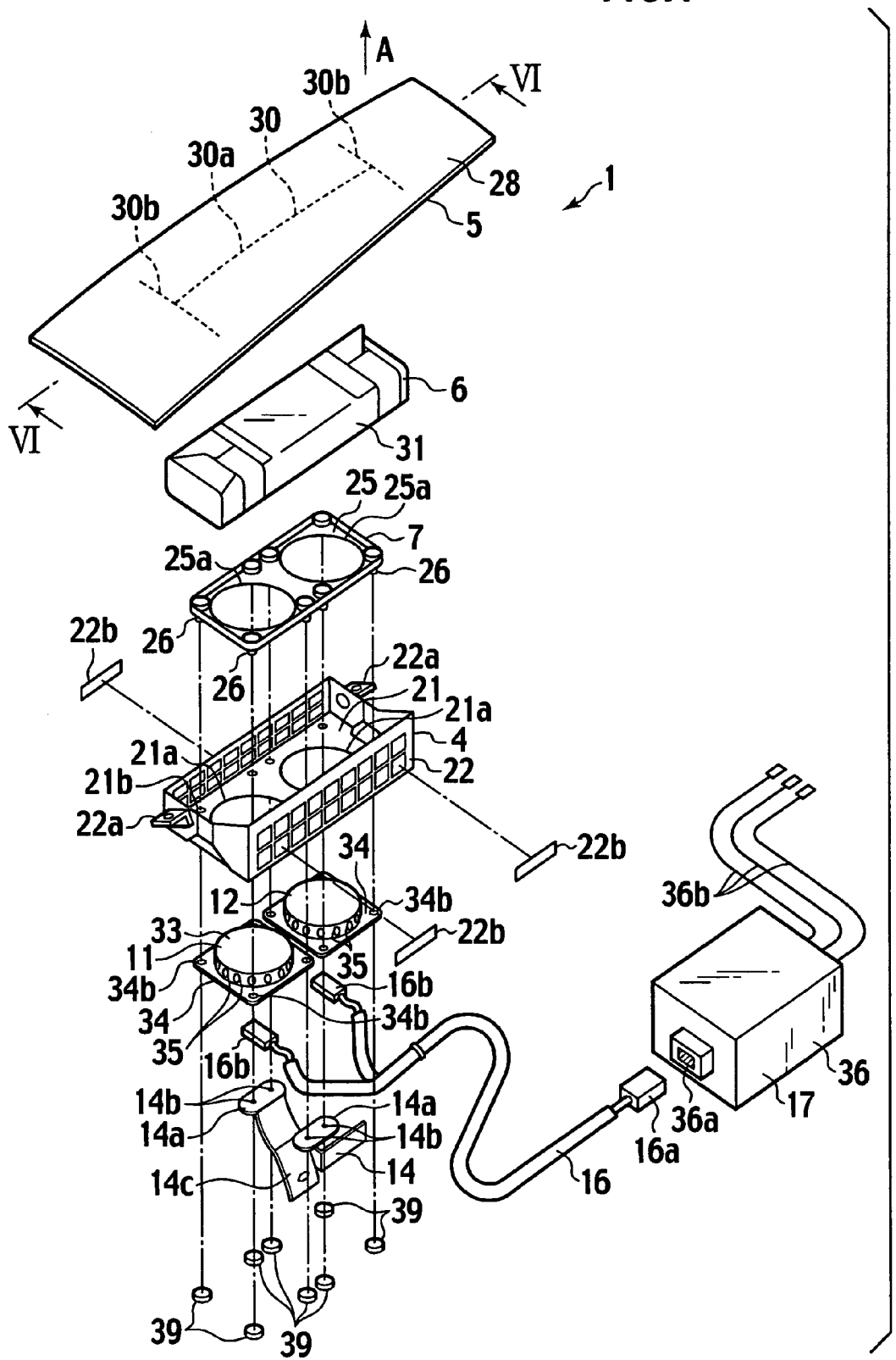

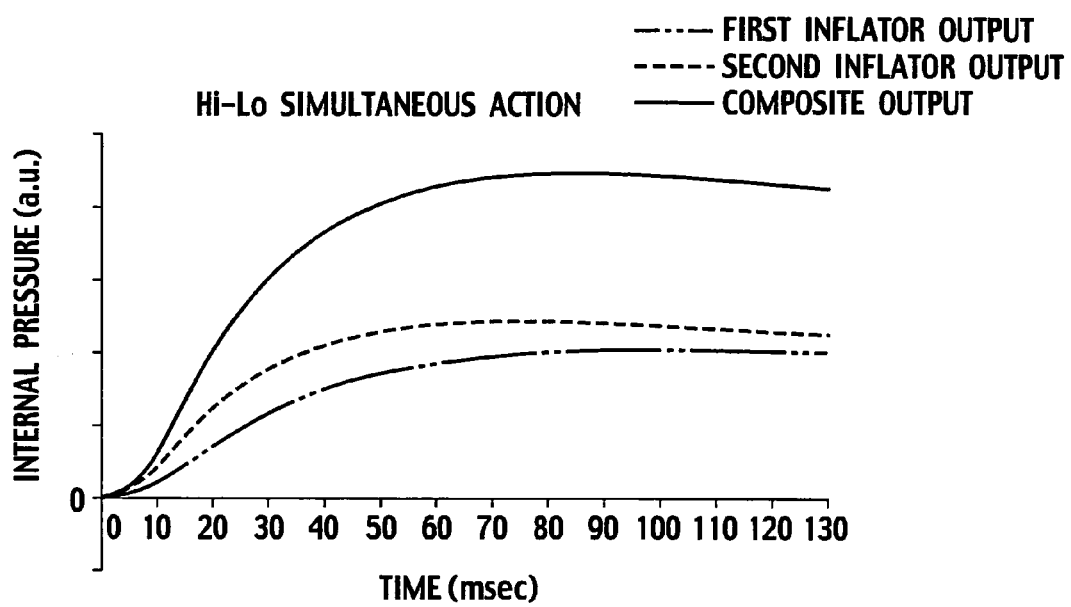
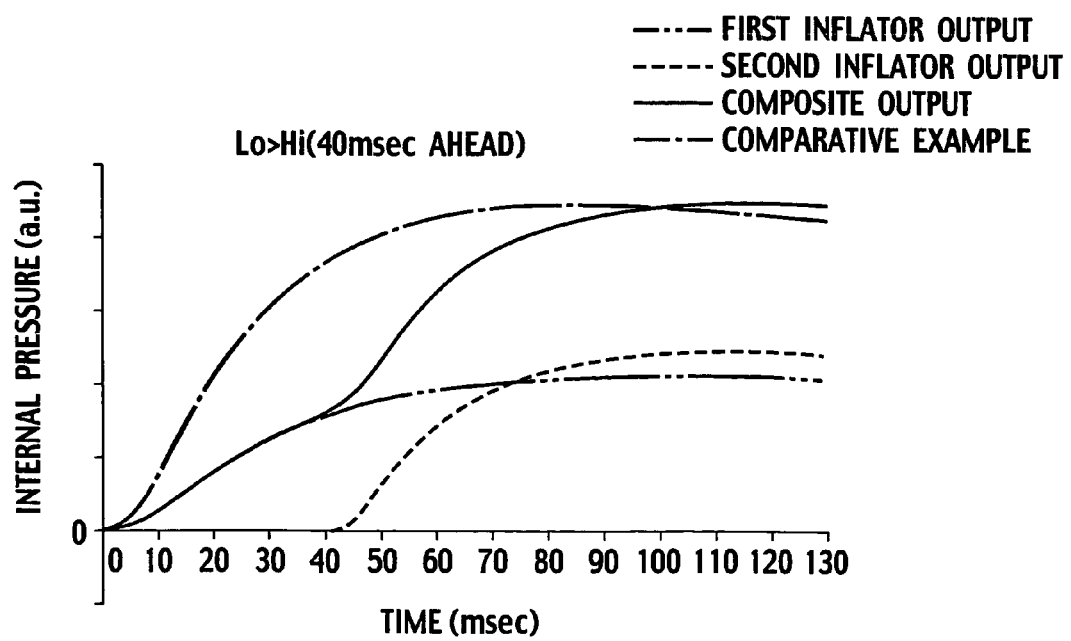

Hi>Lo(40msec DELAYED)

— · · — FIRST INFLATOR OUTPUT
- - - - - SECOND INFLATOR OUTPUT
——— COMPOSITE OUTPUT
— · — COMPARATIVE EXAMPLE

AIR BAG APPARATUS

BACKGROUND OF THE INVENTION

1. Field of the Invention

The present invention relates to an air bag apparatus preferably applied to a front seat next to the driver in an automobile.

2. Description of the Related Art

An automobile is generally provided with air bag apparatuses, which are installed in a steering wheel, a instrument panel and such, for protection of passengers from a shock caused by a collision of the automobile. The air bag apparatuses deploy air bags toward the passengers by means of gas supplied by inflators provided therein. An air bag apparatus applied to a front seat next to the driver usually has a larger volume of an air bag than one applied to the driver's seat, which is usually installed in the steering wheel, and is provided with a rectangular box-shaped case, a folded air bag housed therein and a columnar inflator housed therein.

Japanese Patent Application Laid-open No. H04-92738 discloses an art of an air bag apparatus, which is provided with a plurality of inflators selectively activated depending on a condition. Japanese Patent Application Laid-open No. H02-310142 discloses another art of an air bag apparatus, which is provided with a pair of installation holes on a base plate thereof and adjacent to each other and respectively installed disc-like inflators. According to the art, one of the inflators can be slightly delayed in activation behind another and such a configuration gives a change in a property of an internal pressure increase of the air bag. Japanese Patent Application Laid-open No. 2002-187512 disclose a still another art of an air bag apparatus, in which a folded air bag is wrapped in a seat and hence deploys as if dodging the passenger at a first stage of deploying.

SUMMARY OF THE INVENTION

The present invention is intended for providing an air bag apparatus having similar functions as the above arts with a simple constitution and hence can be produced with a low cost.

According to an aspect of the present invention, an air bag apparatus for a vehicle is provided with an air bag configured to inflate and deploy with inflow of a gas; a first inflator configured to supply the gas to the air bag having a first pressure-time property; and a second inflator configured to supply the gas to the air bag having a second pressure-time property, the second pressure-time property differing from the first pressure-time property. Preferably, the second pressure-time property has a more quick increase in a pressure change than the first pressure-time property. More preferably, the air bag apparatus is further provided with a control device configured to activate the first inflator and activate the second inflator with a controllable delay behind the first inflator. Still preferably, the air bag apparatus is further provided with a control device configured to activate the second inflator and activate the first inflator with a controllable delay behind the second inflator. Further preferably, the first inflator and the second inflator are disposed adjacent to each other along a line intersecting with a moving direction of the vehicle and inject the gas in directions intersecting with the moving direction; and the first inflator is disposed beside a central line of the vehicle. Still further preferably, the air bag apparatus is provided with a sensor configured to sense collision of the vehicle and a control device configured to select an activation mode from a group of a simultaneous activation mode, a first delay-intervening mode and a second delay-intervening mode depending on an information given by the sensor and activate the first inflator and the second inflator in the selected activation mode.

BRIEF DESCRIPTION OF THE DRAWINGS

FIG. 1 is an exploded perspective view of an air bag apparatus according to an embodiment of the present invention;

FIG. 2 is a graph showing a relation between a time and a pressure in a case of simultaneous activation of inflators of the air bag apparatus;

FIG. 3 is a graph showing a relation between a time and a pressure in a case where a second inflator is delayed in activation behind a first inflator;

DETAILED DESCRIPTION OF THE PREFERRED EMBODIMENT

Figure 4:
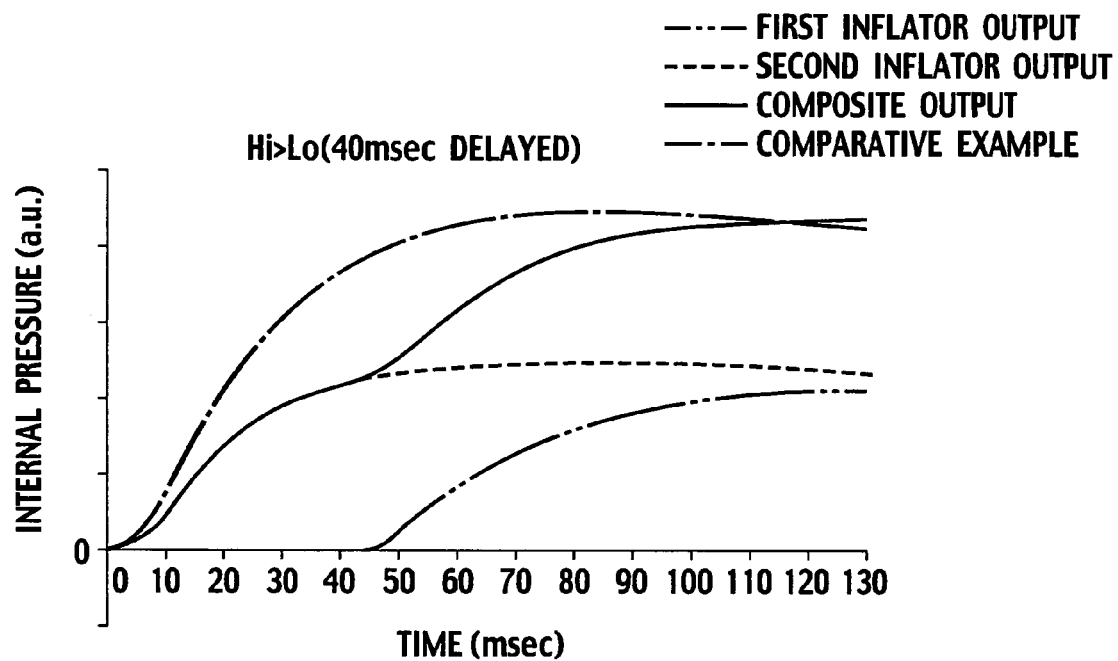
FIG. 4 is a graph showing a relation between a time and a pressure in a case where a first inflator is delayed in activation behind a second inflator.

Throughout the description and the claims, definitions of terms are given as the following. A term "pressure-time property" is defined as a property of a pressure change of a gas, which an inflator supplies to an air bag, with respect to a time after activating the inflator. A term "sharp" with respect to a pressure-time property is defined as having quick increase in the pressure change in an initial stage thereof, namely, having a sharp leading edge when the pressure-time property is illustrated in a graph. A term "dull" is used as an antonym thereof.

An embodiment of the present invention will be described hereinafter with reference to FIGS. 1 through 5. Throughout the description and the claims, the front, the rear, the left and the right are defined with respect to a direction in which an automobile moves.

An air bag apparatus 1 according to the present embodiment of the present invention is installed in an instrument panel in front of a front seat next to a driver of the automobile. The following description will be given on an assumption that the driver's seat is disposed on the left of the automobile and hence the seat next to the driver and the air bag apparatus 1 are disposed on the right, though the air bag apparatus 1 can be disposed on either side. The longitudinal direction of the air bag apparatus 1 is oriented laterally with respect to the automobile. A front window is disposed above the air bag apparatus 1 and a door is disposed on the right.

The air bag apparatus 1 is provided with a retainer 4 as a casing, a cover 5 attached to the retainer 4, a folded air bag 6, a mid-retainer 7, a first inflator 11, a second inflator 12, a bracket 14 and such, as shown in FIG. 1. A control device 17 is connected to the first and second inflators 11 and 12 via a wiring harness 16 and is linked with a sensor (not shown).

The retainer 4 has a substantially box-like shape having an open top and is provided with a bottom plate portion 21, which has a laterally long rectangular shape, and a side plate portion 22 bent upward from a periphery of the bottom plate portion 21. The bottom plate portion 21 has a pair of circular inflator installation openings 21a, which are disposed side-by-side. Four installation holes 21b are formed around each of the inflator installation openings 21a. A pair of brackets 22a, to which the cover 5 is fixed by means of fastener such as screws, are fixed on the left and right sides of the side plate portion 22. Labels 22b, on which cautionary instructions, bar codes and such are printed, adhere to the front and rear sides of the side plate portion 22.

The mid-retainer 7 is provided with a mid-retainer base plate portion 25, which has a laterally long rectangular shape and is to lie on and fit the bottom plate portion 21. Moreover, the mid-retainer base plate portion 25 has a pair of circular openings 25a, which are respectively aligned with the inflator installation openings 21a, and eight pre-attached bolts 26 as fastening means, which are respectively aligned with the installation holes 21b. The mid-retainer 7 is housed in the folded air bag 6 in advance of folding the air bag 6 in a manner that ends of the bolts 26 are exposed therefrom, though FIG. 1 does not show such a situation for convenience of explanation.

The bracket 14 is formed of sheet metal or such and provided with retainer fixation portions 14a, which is fixed on a rear surface of the bottom plate portion 21 of the retainer 4, and a body fixation portion 14c, which is fixed to a body of the automobile. The retainer fixation portions 14a are respectively provided with installation holes 14b, which are respectively aligned with the installation holes 21b of the bottom plate portion 21.

The air bag 6 is made from one or more sheets of base cloth stitched together so as to form a bag. The air bag 6 has a pair of circular openings (not shown), respectively aligned with the inflator installation openings 21a, and eight holes, respectively aligned with the installation holes 21b.

The cover 5, or referred to as a lid, is integrally formed of synthetic resin and provided with a lid portion 28 for being attached to an opening formed on the instrument panel and an installation piece (not shown) projecting from a rear surface of the lid portion 28. The lid portion 28 is provided with tear lines 30 constituted of a center tear line 30a and a pair of side tear lines 30b so as to form an H-letter shape. The air bag 6 is wrapped in a breakable sheet 31 so as to be kept in a folded state.

Each of the first and second inflators 11 and 12 is provided with an inflator main body 33 having a low-profile columnar shape and a flange portion 34 projecting outward from a periphery of the inflator main body 33. Each of the inflator main bodies 33 has a plurality of gas injection holes 35 on and around an outer cylindrical surface thereof. A diameter of the inflator main bodies 33 is slightly smaller than one of inflator installation openings 21a. The flange portions 34 respectively have installation holes 34b respectively aligned with the installation holes 21b. The inflator main bodies 33 further respectively have connectors (not shown) for connection with the wiring harness 16.

The first and second inflators 11 and 12 have different properties as described later, namely, differ in a pressure-time property of a pressure change of a gas with a time in an initial stage. For example, the second inflator 12 has a shaper pressure-time property, namely, generates higher pressure in a shorter time, as compared with the first inflator 11 as shown in FIG. 2. Such difference can be obtained, for example, in a manner that a standard product is applied to one of the inflators and a modified product, which is modified from a standard product so as to have a sharper or duller pressure-time property, is applied to the other of the inflators. When such inflators simultaneously act, a predetermined composite output as shown in FIG. 2 is obtained.

The control device 17, or referred to as an electronic control unit (ECU), is provided with a central processing unit (CPU), a ROM and such and the whole of them are housed in a chassis 36. A connector 36a for connection with the wiring harness 16 and cables 36b for connection with sensors (not shown) are led out of the chassis 36.

The wiring harness 16 includes a plurality of cables. One end thereof is provided with a connector 16a for connection with the connector 36a of the control device 17 and the other ends thereof are provided with connectors 16b respectively connecting with the first and second inflators 11 and 12.

An assembly process of the air bag apparatus 1 will be described hereinafter.

First, the mid-retainer 7 is inserted in the air bag 6 and the openings 25a of the mid-retainer 7 are respectively aligned with the corresponding openings of the air bag 6. The ends of the bolts 26 are drawn out of the holes of the air bag 6. In this condition, the air bag 6 is folded so as to form a predetermined shape and wrapped in the breakable sheet 31. The folded air bag 6 wrapped in the breakable sheet 31 is housed in the retainer 4 and the bolts 26 projected from the air bag 6 are respectively inserted in the installation holes 21b. The cover 5 is laid above the air bag 6 and fixed with the brackets 22a of the retainer 4 by tightening the screws.

Next, the main bodies 33 of the inflators 11 and 12 are inserted in the air bag 6 through the installation openings 21a from the bottom and then the bolts 26 are respectively inserted in the installation holes 34b. The retainer fixation portions 14a of the bracket 14 are fit on the back surface of the inflators 11 and 12 and then the four of the bolts 26 are respectively inserted in the installation holes 14b.

In this condition, the bolts 26 are respectively screwed into nuts 39 and hence the air bag 6, the mid-retainer 7, the first and second inflators 11 and 12 and the bracket 14 are fixed to the retainer 4. Then the body fixation portion 14c is fixed to a reinforce member of the automobile body, thereby the air bag apparatus 1 is fixed to the automobile body. The control device 17 is disposed in a proper site of the automobile and connected with the first and second inflators 11 and 12 via the wiring harness 16 and with the sensors for sensing impact disposed in predetermined sites via the cables 36b.

When the automobile collides with something, any of the sensors detects impact and then starts the control device 17 so that the inflators 11 and 12 supply gas to the air bag 6. Thereby the air bag 6 inflates to break the cover 5 along the tear lines 30 and further deploys out of the cover 5. Then the air bag 6 deploys in front of and protects the passenger.

According to the present embodiment of the present invention, the paired inflators 11 and 12 can supply a larger amount of the gas to the air bag 6 than a single inflator. As the inflators 11 and 12, standard products can be employed and hence a production cost can be reduced as compared with a case where a specially produced inflator having a larger capacity is solely employed.

The paired inflators 11 and 12 can be individually activated by means of the control device 17 so that one is delayed in activation behind another with a controllable delay. Such operation provides a controllability of a relation between a time and a pressure with respect to the gas supplied to the air bag 6 as described hereinafter.

FIG. 3 gives an example in which the second inflator 12 is delayed in activation behind the first inflator 11 with a controllable delay. In this example, the first inflator 11 has a duller pressure-time property than the second inflator 12. The first inflator 11 is first activated and the second inflator 12 is activated with a predetermined delay of 40 msec in this example, so that the composite output has a relatively dull leading edge and a notable increase after the predetermined time. This leads to relatively slow inflation of the air bag 6 in an initial stage and relatively rapid deployment in a succeeding stage. A deployment property of the air bag 6 given by this operation is particularly preferable for a case where the passenger is disposed close to the air bag apparatus 1.

FIG. 4 gives another example in which the first inflator 11 is delayed in activation behind the second inflator 12. Also in this example, the first inflator 11 has a duller pressure-time property than the second inflator 12. The second inflator 12 is first activated and the first inflator 11 is activated with a predetermined delay of 40 msec in this example, so that the composite output has a relatively sharp leading edge and a dull increase after the predetermined time as compared with the former example. This leads to rapid inflation of the air bag 6 in an initial stage and reduced pressure, which shall be from 60 through 70% of full ability of the whole system. A deployment property of the air bag 6 given by this operation is particularly preferable for a case where a non-head-on collision, so called "an off-set collision", is happened.

Operation of the inflators 11 and 12, exemplified as in FIG. 2 in which a simultaneous activation mode is shown and further exemplified as in FIGS. 3 and 4 in which a delay-intervening mode is shown, can be properly selected from a group of a simultaneous activation mode as shown in FIG. 2, a first delay-intervening mode as shown in FIG. 3 and a second delay-intervening mode as shown in FIG. 4 by means of the control device 17. Moreover the control device 17 can be properly regulated depending on information obtained by the plural sensors. The sensors can be disposed in various sites in the automobile and furthermore various types of sensors can be applied thereto, for example, a collision sensor disposed at an outside of the automobile, an accelerometer sensor disposed at an inside of the automobile, optical, ultrasonic, radio-wave and load-cell sensors for detecting a position and a weight of the passenger, thereby information on a collision situation, a passenger's posture and such is obtained by the sensors. Therefore, the control device 17 can be controlled in a regulation such as; in a case where the passenger is detected to be close to the air bag apparatus 1, the control device 17 controls the inflators 11 and 12 in a delay-intervening mode as shown in FIG. 3, and in a case where the off-set collision is happened, the control device 17 controls the inflators 11 and 12 in another delaying mode as shown in FIG. 4.

The first and second inflators 11 and 12 having different pressure-time properties are capable of generating a biased gas-flow, which can be employed to control shapes of the deploying air bag 6.

Figure 5:
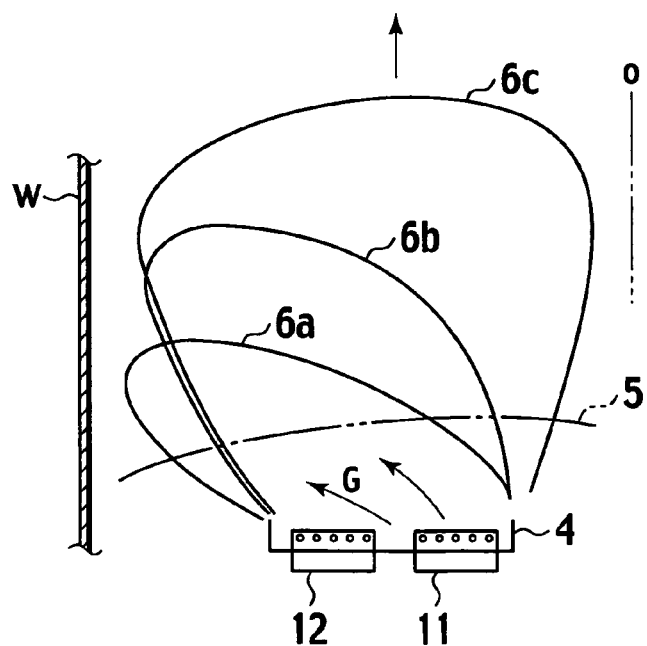
FIG. 5 is a schematic drawing explaining an operation of the air bag apparatus.

Referring to FIG. 5, the air bag apparatus 1 is opposed to the passenger seated in the automobile and the first and second inflators 11 and 12 are disposed adjacent to each other along a line intersecting with a moving direction A of the automobile at substantially right angles. Then the first inflator 11 having the duller pressure-time property is disposed beside a central line O of the automobile and the second inflator 12 having the sharper pressure-time property is disposed beside a side-window W. The gas injection holes 35 of the first and second inflators 11 and 12 are oriented in directions intersecting with the moving direction A at substantially right angles. Provided that the first inflator 11 is activated ahead of the second inflator 12, the gas supplied to the air bag 6 is biased as illustrated by arrows G. The biased gas controls the shapes of the deploying air bag 6 as illustrated by reference numerals 6a, 6b and 6c. In the initial stage, the air bag 6 deploys in the shape 6a biased toward the side-window W with a moderate gas pressure, which effectively prevents the passenger from being thrown out of the automobile. In the succeeding stage, the air bag 6 deploys in the shape 6b and consequently in the shape 6c and hence effectively protects the passenger.

For similar purposes with the present invention, there is proposed an art in which a single inflator includes two squibs housed in a housing. However, one of the squibs activated ahead of the other increases an internal pressure within the housing and hence would affect the property of the other squib. As compared with the proposed art, the present invention gives small mutual effect between the first and second inflators 11 and 12 because individual squibs are separately housed in the inflators 11 and 12. Thereby a desired property can be easily obtained.

Figure 6:
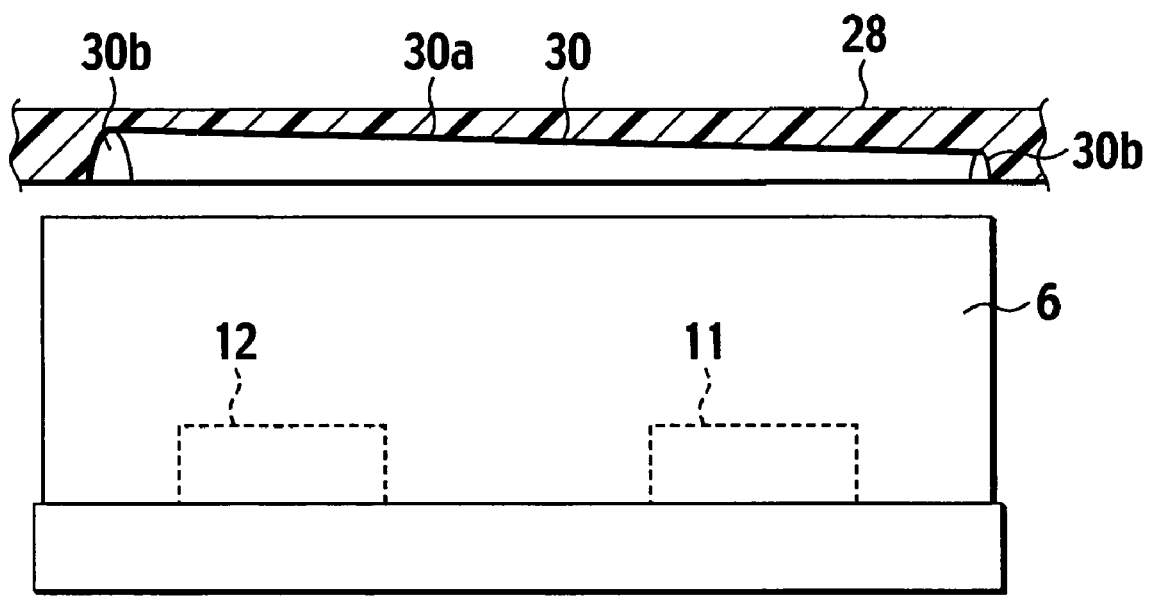
FIG. 6 shows a modified embodiment of the present invention as indicated by a sectional view taken from a line VI-VI of FIG. 1.

The cover 5 can be also modified as shown in FIG. 6, in which the tear lines 30 are unequally engraved so as to have inequality in aptness to break. More specifically, the center tear line 30a is obliquely engraved so as to be deeper at an end near the side-window W (shown on the left in FIG. 6) and shallower at another end near the central line O of the automobile (shown on the right in FIG. 6). Thereby the tear lines 30 on the left are more apt to break and will lead the air bag 6 biased toward the side-window W in an initial stage of deployment. As the alternative to such oblique tear lines, the tear lines 30 can be formed in a step-like shape.

In the aforementioned embodiments of the present invention, the air bag apparatus 1 includes a pair of inflators, however, three or more inflators may be provided. The three or more inflators may have individually distinct properties. Or, some of the inflators have a common property and the others have distinct properties. All inflators may be activated one by one or some of the inflators may be simultaneously activated. These modifications give a variety of preferable deployment properties.

The plural inflators are not limited to be a common shape but may have individually distinct shapes. Moreover, the inflators are not limited to be combustion types (pyro-types) but may be types of pooling compressed gas, hybrid types or any various types. The inflators may include any other members, for example, guiding member for guiding the gas in a proper direction.

In the above description, the air bag apparatus 1 is opposed to the passenger seated in the automobile and the inflators are disposed along a line intersecting with a moving direction A of the automobile at substantially right angles. However, the air bag apparatus 1 may be disposed on either side of the passenger and the inflators are disposed parallel to the moving direction A.

Furthermore, the air bag apparatus 1 may be applied to any other vehicles such as a ship, an airplane and so on.

Although the invention has been described above by reference to certain embodiments of the invention, the invention is not limited to the embodiments described above. Modifications and variations of the embodiments described above will occur to those skilled in the art, in light of the above teachings.

What is claimed is:

1. An air bag apparatus for a vehicle, comprising:
   an air bag configured to inflate and deploy with inflow of a gas;
   a first inflator provided with a plurality of first gas injection holes configured to supply the gas to the air bag having a first pressure-time property;
   a second inflator provided with a plurality of second gas injection holes configured to supply the gas to the air bag having a second pressure-time property, the second pressure-time property differing from the first pressure-time property;
   wherein the second pressure-time property has a quicker increase in a pressure change than the first pressure-time property;

the first and second inflators are disposed adjacent to each other behind the air bag; and the first and second inflators inject the gas in directions normal to a direction facing the air bag;

wherein the first inflator is disposed beside a central line of the vehicle and the second inflator is disposed beside a side window of the vehicle.

2. The air bag apparatus of claim 1, further comprising:

a control device configured to activate the first inflator and activate the second inflator with a controllable delay behind the first inflator.

3. The air bag apparatus of claim 1, further comprising:

a control device configured to activate the second inflator and activate the first inflator with a controllable delay behind the second inflator.

4. The air bag apparatus of claim 1, further comprising:

a sensor configured to sense collision of the vehicle; and a control device configured to select an activation mode from a group of a simultaneous activation mode, a first delay-intervening mode and a second delay-intervening mode depending on an information given by the sensor and activate the first inflator and the second inflator in the selected activation mode.

5. The air bag apparatus of claim 1, wherein the first and second inflators have a low-profile columnar shape;

each of the plurality of first and second gas injection holes is provided on and around respective outer cylindrical surfaces of the first and second inflators; and top surfaces of the first and second inflators face the air bag.

6. The air bag apparatus of claim 1, further comprising a box-shaped retainer housing the airbag, wherein the first and second inflators are fixed to a bottom surface of the box-shaped retainer so as to arrange the first and second gas injection holes between the air bag and the bottom surface.

* * * * *